united States Patent Office 3,553,148
Patented Jan. 5, 1971

3,553,148
METHOD OF MAKING A CALCIUM GEL AND
THE PRODUCT OF THIS METHOD
Emile Louis Eugene Bourland, 6 Rue Gambetta,
Persan 95, France
No Drawing. Filed Nov. 17, 1967, Ser. No. 683,806
Claims priority, application France, Nov. 21, 1966,
84,304
Int. Cl. A61k 27/00; B01j 13/00; C12k 1/10
U.S. Cl. 252—316                                    5 Claims

ABSTRACT OF THE DISCLOSURE

A method of making a calcium gel for use as an excipient for parenteral administration of a medicament and as a medium for the growth, suspension and preparation of biologically active materials wherein a saturated aqueous solution of at least one calcium organic salt (e.g. calcium lactate) slightly soluble in water, is admixed under agitation with a hot saturated solution containing, at least partially in suspension, calcium glycerophosphate. The gel is thixotropic and may contain magnesium or manganese organic salts as well.

My present invention relates to the preparation of calcium-containing gels for use as a vehicle for parenteral administration of a pharmacological substance, as a growth medium for bacteria and other biologically active materials, as an excipient or the like and, more particularly, to a gel, containing calcium lactate and calcium glycerophosphate.

The use of calcium-containing gels for biological and pharmacological purposes, especially as a vehicle for the parenteral administration of pharmaceuticals and as a biological-growth medium has already been proposed. In such systems, the gel is prepared by dispersing or dissolving calcium salts in water to which is added a gel-forming material such as gelatine, or agar-agar. Such gels are not always convenient to produce, are often characterized by a highly viscous state when increased fluidity is desirable and may be inhomogeneous.

It is, therefore, the principal object of my present invention to provide an improved method of producing calcium-containing gels which avoid the disadvantages of earlier calcium gels, which can be carried out with a minimum of expertise or care, and which yields a homogeneous gel particularly suitable for use as a vehicle or medium of the character described.

A further object of this invention is to provide a thixotropic calcium gel for the purposes described which remains homogeneous until used, is nonallergenic and evokes minimum reaction when used as a parenteral vehicle, and is thixotropic, i.e. can be made fluid upon use by agitation.

I have now found that it is possible to make a calcium-containing gel, which may also contain manganese or magnesium as described hereinafter, which is particularly effective as an excipient or vehicle for parenteral administration to humans and other animal species and is able to serve as a source of calcium where calcium deficiencies form a part of the therapeutic indications to be treated, by mixing solutions of two calcium salts which are slightly soluble in water, including a saturated solution of a first salt (preferably calcium lactate) having a solubility in the range of about 0.5% to 20% at room temperature (i.e. about 25° C.) with an aqueous suspension of a second calcium salt in a saturated solution thereof under intensive agitation and in a heated state of both solutions. The second calcium salt, which advantageously is calcium glycerophosphate, may be an organic salt of calcium having a solubility range from about 0.01% to about 5% in water at room temperature. A solubility of 0.5% to 20% connotes a solubility of the first salt between 0.5 g. and 20 g. per 100 ml. of water while the solubility of 0.01% to 5% connotes a solubility of 0.01 g. to 5 g. per 100 ml. of water. The first salt should be an oxygen-containing organic salt whose organic portion is a low-molecular weight, sugar-type acid, i.e. an acid containing one or more hydroxyl groups and may have a carbon number ranging from 1 to 10. In addition to the lactate, therefore, calcium salts of gluconic acid and the like may be used. The second salt may be any salt containing the glycero group although the glycerophosphate is preferred.

According to a more specific feature of this invention, the gel is prepared by dissolving the first calcium salt, which is slightly soluble in water at room temperature and is preferably calcium lactate or calcium gluconate although a minor fraction of this salt may be replaced by a corresponding manganese or magnesium salt, in water at an elevated temperature, preferably close to the boiling point of the solution. Most desirably, the first salt should be one which is soluble in about one part of the salt to about 18.5 parts of water at about 15° C. Simultaneously, another solution of the second salt, preferably the calcium glycerophosphate, is prepared which contains the salt in an amount exceeding the solubility of the salt under agitation. The second salt preferably has a solubility on the order of 1%. The first solution is then admixed with the suspension of the second salt under continued agitation to form the gel.

EXAMPLE 400 g. of calcium lactate, $Ca(C_3H_5O_3)_2 \cdot 5H_2O$, is dissolved in 3 l. of distilled water in a first flask by heating the same until complete dissolution. Calcium lactate is much more soluble in the hot water than in cold water. The hot saturated solution is held in readiness at a temperature to which it has been heated to effect complete dissolution without further temperature rise. In a second flask, provided with a mechanical agitator such as a magnetic or blade-type stirrer, 400 g. of calcium glycerophosphate, $CaC_3H_7O_2PO_4$, is maintained in suspension in 4 l. of water. While this suspension may be heated, heating thereof is not essential. While the second solution is agitated rapidly, the hot concentrated solution of calcium lactate is pulled into the suspension of calcium glycerophosphate and agitation maintained for 15 minutes thereafter. The product is a white opalescent liquid of considerable mobility which, in time, gels. Upon agitation, however, it again becomes highly fluid. Upon heating, it remains homogeneous at any temperature to which it is brought. The product can be sterilized by heating in the usual manner. The gel is an effective substitute as a pharmaceutical medium for intramuscular injection and has the proper consistency for this purpose. It is compatible with and absorbs organic materials such as the proteins, toxins or oil-soluble substances such as vitamins. It is stable upon heating to sterilization temperatures and at all temperatures between the sterilization temperature and room temperature. It also forms a satisfactory vehicle for substances which are insoluble in water.

By replacing up to 50% of the calcium lactate with other lactates, especially magnesium lactate and/or manganese lactate, one is able to obtain mixed gels of calcium-manganese or calcium-magnesium. The lactate may also be replaced by the other organic salts such as calcium gluconate.

I claim:

1. A method of forming a calcium-containing gel, comprising the steps of forming a hot concentrated aqueous solution of a first organic salt selected from the group which consists of calcium lactate and calcium gluconate, slightly soluble in water, forming an aqueous suspension of calcium glycerophosphate; and mixing under agitation the hot concentrated solution of said first salt with the aqueous suspension of said calcium glycerophosphate to produce the gel.

2. The method defined in claim 1, further comprising the step of dissolving in said solution a manganese or magnesium lactate or gluconate salt.

3. The method defined in claim 2 wherein the last-mentioned salt is manganese lactate.

4. The method defined in claim 2 wherein the last-mentioned salt is magnesium lactate.

5. A thixotropic gel made by the method of claim 1.

References Cited

UNITED STATES PATENTS

| | | | |
|---|---|---|---|
| 2,144,830 | 1/1939 | Breed et al. | 424—317 X |
| 2,657,172 | 10/1953 | Sattler, Jr. | 424—317 X |
| 3,386,921 | 6/1968 | Schweiger et al. | 252—316 |

RICHAR D. LOVERING, Primary Examiner

U.S. Cl. X.R.

195—100; 424—315, 317